Nov. 18, 1952  F. V. JOHNSON ET AL  2,618,159
FLOATED GYROSCOPE

Filed July 1, 1950  2 SHEETS—SHEET 1

Inventors
Frithiof V. Johnson
Francis R. Fowler
by
Their Attorney

Nov. 18, 1952     F. V. JOHNSON ET AL     2,618,159
FLOATED GYROSCOPE

Filed July 1, 1950     2 SHEETS—SHEET 2

Inventors
Frithiof V. Johnson
Francis R. Fowler by    *Claude A. Mott*
Their Attorney Patented Nov. 18, 1952

2,618,159

UNITED STATES PATENT OFFICE 2,618,159

FLOATED GYROSCOPE

Frithiof V. Johnson, Scotia, and Francis R. Fowler, Ballston Lake, N. Y., assignors to General Electric Company, a corporation of New York Application July 1, 1950, Serial No. 171,582

12 Claims. (Cl. 74—5)

This invention relates to navigational devices and more particularly to devices of the gyroscopic type which derive support from a plurality of gimbals.

Gimbal supported gyros are used for many control purposes and in certain applications there exists the difficulty of adequately supporting gyroscopic devices during shock such as would be experienced for example when dropped from an airplane into water. A gyro is a precision device which is supported by gimbals having very delicate bearings adapted to make it as frictionless as possible. Such a device must not wander due to unwanted torques. Any shock sustained by such an instrument places a tremendous strain on the gimbal bearings and exposes the whole gyroscopic assembly to serious damage and subsequent malfunctioning.

It is an object of this invention to provide a gyroscopic device whose delicate gimbal mechanism will experience no shock when the device is dropped.

It is a further object of our invention to provide a shock proof gyroscopic device which may be equipped with less exacting bearing means between its gimbal elements.

It is still another object of our invention to provide a gyroscopic device whose gimbals and gimbal bearings are continually immersed in a fluid.

Still another object of our invention is to provide a gyroscopic device having pickup means and precession means which are self-contained within a sealed container filled with a fluid.

According to our invention, the gyro wheel is mounted inside a hermetically sealed housing supported by external bearings. This housing is gimbal mounted to permit universal freedom of movement of the gyro, and the whole assembly is immersed into a sealed container which is filled with a fluid which is buoyant. The size and weight of each of the movable elements of the assembly are so chosen with respect to the specific gravity of the fluid that they will be buoyed in substantially neutral suspension.

The invention will be more fully understood by referring now to the accompanying drawings wherein corresponding elements of different views are designated by like reference characters.

Figure 1:
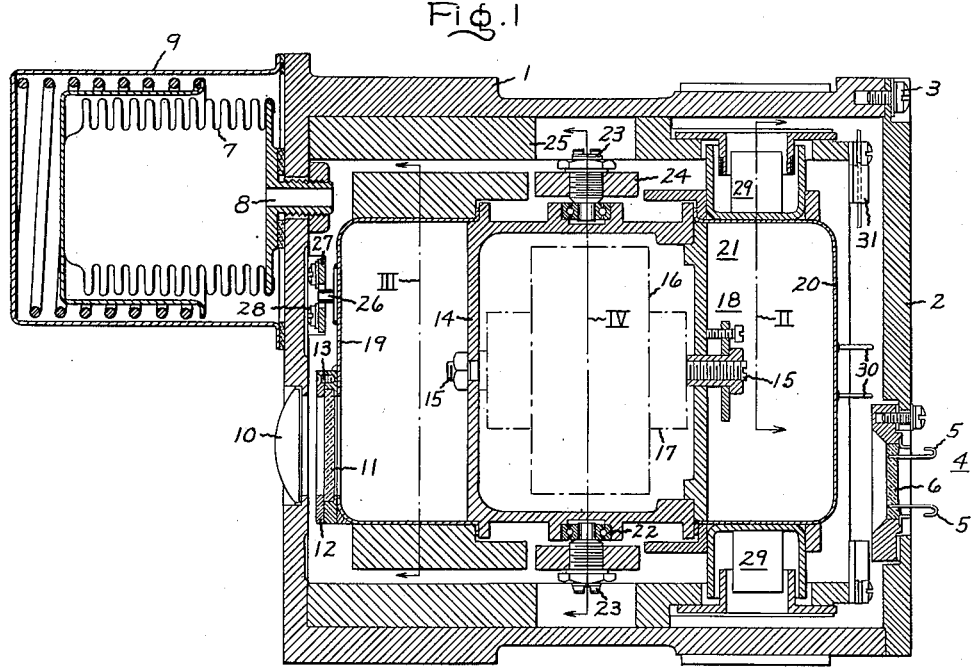
Fig. 1 is a side elevational view in cross section of our gyroscopic device.

Referring now to Fig. 1, we have shown our gyroscopic device as comprising an outer container 1 which may be sealed by a cover 2 by means of screws such as shown at 3. The cover 2 has a sealable opening generally indicated as 4 by means of which a plurality of leads 5 may be taken through a glass seal 6 for energizing electrical components within the container.

On the left side of the container we have provided an expansible chamber or bellows 7 the interior of which communicates with the interior of container 1 through opening 8 in the hollow threaded section at the right end of the bellows by means of which section it is supported to the container 1. The bellows 7 is provided with its own separate enclosure 9.

The lens 10 on the lower left part of the housing forms part of an optical pick-off arrangement and serves to transmit light to a mirror 11 inside the container which is supported by a retaining ring 12 and secured by screws such as shown at 13.

The assembly within the container 1 generally comprises the movable gyroscopic elements. A gyro housing 14 has a bearing shaft 15 centrally disposed therein and this shaft is coaxial with the spin axis of the rotor wheel which is diagrammatically illustrated by the line 16 since the details of the gyro wheel and the motor elements for driving it do not form a part of this invention and are well known per se. The gyro wheel is adapted to rotate on bearings located within the diagrammatically represented end boxes 17. End play in the gyro wheel bearings may be adjusted as necessary in any suitable manner such as by a washer and screw arrangement generally indicated by the numeral 18.

The housing which encloses the gyroscope is provided with outwardly extending hollow covers or caps 19, 20 and for reasons which will later become apparent, these covers may be made larger than is necessary merely to enclose the gyroscope.

For purposes of clarity, the enclosure for the gyro wheel including the end covers 19, 20, may be conveniently referred to as the gyro can 21.

These covers serve the additional purpose of hermetically sealing the gyroscope so that it will be free to rotate without impediment.

In order to provide universal freedom of movement of the gyro can, the usual gimbal connections are provided. Thus, the housing 14 has a pair of oppositely disposed bearings 22 recessed therein with which there is cooperatively associated, a pair of adjustable members 23 which are threaded into a gimbal 24 and adapted to provide for pivotal movement of the gyro can 21 about an axis normal to the spin axis of the gyro.

Figure 4:
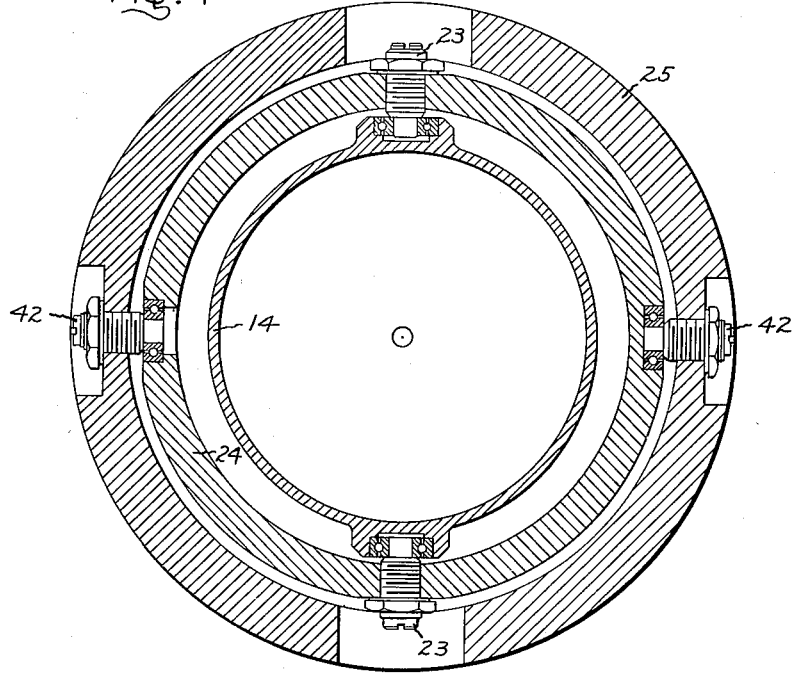
Fig. 4 is a sectional view taken through the line IV.

Gimbal 24 is in turn connected to move within a frame about an axis normal to the gyro spin axis and to the gimbal bearing axis as will be more clearly apparent from Fig. 4.

The frame 25 is snugly held within the interior of container 1 which is made just large enough to accommodate the entire assembly within it.

The particular embodiment illustrated and described is made compactly for a particular application and it will be clear therefore, that while the gyro can 21 may move universally in any direction, the extent of such travel is intentionally limited. In fact, in order that movement of the gyro can will not exceed a certain predetermined amount, there is provided, as shown on the left side of the drawing, a mechanical stop arrangement which comprises a pin 26 which projects outwardly from the cover 19 and within the confines of a guide 27 mounted on the container by means of screws such as shown at 28.

In order to exert a precessing torque on the gyro can, we have provided a plurality of torque motors, Fig. 1 showing two of these which are generally indicated by the numeral 29, and the details of which will be more fully described in connection with Fig. 2. Let it suffice to say at this point that these motors are adapted to exert a force on the end of the gyro can cover 20 so as to produce a torque. As will be further described in connection with Fig. 3, a similar pair of torque motors acts on gyro can cover 19, but at right angles to the force exerted by the torque motors on cover 20 and the latter torque motors exert a torque about a vertical axis.

All torque motors may be energized via leads taken through the glass seal 4. To energize the gyro motor (not shown) which drives the gyro wheel, we have provided insulated terminals 30 which project through cover 20 and to which flexible leads (not shown) may be connected, via insulating terminal block 31 which is fixed with respect to container 1 to leads passing through the glass seal 4 for the purpose of energization by an outside source of power.

From the foregoing description it will be clear that the gyroscopic assembly thus far described would be subject to severe damage, especially at the bearings, if exposed to external shock. According to our invention, we have succeeded in overcoming this obstacle by filling the interstices between the gyro can 21 and the container 1 with a buoyant fluid so that each of the movable members of the assembly which are connected by bearings will be buoyed up by the fluid by a force such as will keep each of these members in neutral suspension in the fluid. The fluid should preferably have a high specific gravity and low viscosity such as carbon tetrachloride, tetrabromoethane or bromoform for example. In order that each unit will be neutrally suspended in the fluid it is necessary that their individual overall effective specific gravity be such that they will each independently be neutrally suspended in the fluid. With this consideration in mind, the weight and dimensions of the materials going into the construction of the gyro can, for example, will have to be chosen with care according to well known principles. It will be understood of course, that many materials are suitable and that different materials may be used in the construction of any particular unit just so long as the overall effective specific gravity of any particular bearing-supported unit is substantially equal to the specific gravity of the fluid used. (As a matter of fact, Invar was used in making the frame 14.) If desired, suitable material may be added to any unit in the form of floats, and the enlarged covers 19 and 20 act as such floats.

In order to provide for expansion and contraction, fluid in container 1 communicates with the space within the bellows 7 thereby providing necessary flexibility due to temperature changes.

It will be realized of course that the particular fluid used, should be an insulator and have no deleterious effects on other materials of the device and should allow flexible connectors, torque motors, pickoffs, and such accessories to be used just as though the apparatus were immersed in air.

With the above described construction, it will be found that the pivot bearings are subjected to only very small loads whether the apparatus is at rest or under high accelerations. Very small ball bearings, or small diameter sleeve bearings may therefore be used if desired, and the friction torques will be much smaller than if the bearings had to support the entire weight of the assembly.

Some types of unbalance, such as the very troublesome one resulting from end play in the gyro pivot bearings of vertical gyroscopes, are eliminated and therefore it is unnecessary to use great care in the selection and adjustment of these bearings.

Figure 2:
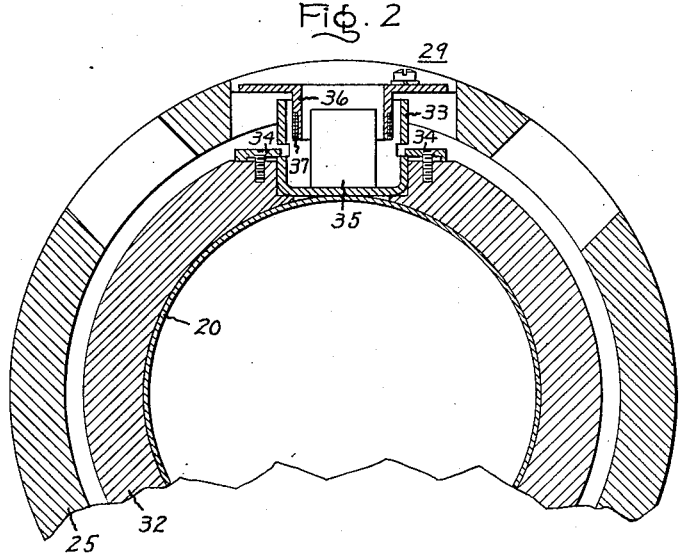
Fig. 2 is a partly broken sectional view taken through the line II of Fig. 1.

Referring now to Fig. 2, we show the side view of a torque motor 29 which is located between the gyro can cover 20 and the outer gimbal 25. The cover 20 has an annular band 32 fitted about its periphery and this band has two oppositely disposed recesses into which a receptacle 33 is held by two screws 34. In the center of this receptacle and extending outwardly, there stands a permanent magnet 35 which for example may be of the Alnico type. The frame 25 which extends over and surrounds the band 32 also has oppositely disposed recesses into which there are inserted cooperating hollow spools 36 the ends of which move between the magnet 35 and the inner wall of the receptacle 33. In an annular recess at the lower periphery of the spool 36, there is a coil winding 37. From the structure shown therefore, it will be seen that energization of the winding 37 will cause a repelling or attracting force to be exerted on the magnet 35 which in turn will cause a precessing torque to be exerted on the gyro in accordance with well known principles.

The pair of torque motors 29 operates to apply torque to the gyro can 21 about a horizontal axis. The other pair of torque motors 39 which appear in Fig. 3 are of similar construction and apply torque to the gyro can about a vertical axis.

Figure 3:
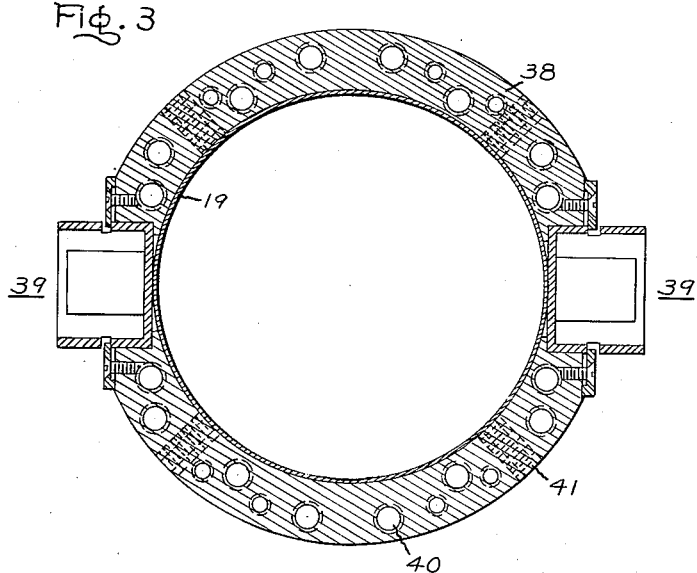
Fig. 3 is a sectional view taken through the line III.

Fig. 3 is a sectional view taken through the line III—III and shows the cover 19 of the gyro can in cross section as having an annular member 38 fitted over its periphery. Recessed in the member 38 and on opposite sides thereof are portions of the torque motor which we may indicate by the general numerals 39 since they are identical to torque motor 29 just described in connection with Fig. 2. Torque motors 39 are located about an axis normal to torque motors 29 as shown in Fig. 3. It will be noted that the annular member 38 has a number of symmetrically disposed threaded openings therein such as at 40 and 41. These openings provide a means for receiving balancing and buoyancy adjusting screws.

Looking now to Fig. 4, we have shown a view in cross section of the gimbal bearing connections and it is the bearings shown in this view that it is particularly important to protect from friction and damage by shock. The gyro spin axis may be visualized as revolving about a point which is concentric with all of the annular members shown in Fig. 4. The housing 14 will be recognized from Fig. 1 as being the member within which the gyro wheel is supported and which forms part of the hermetically sealed enclosure referred to as the gyro can. It is pivotally connected to the gimbal 24 by the bearing members 23 thus permitting movement of the gyro can about an axis normal to the gyro spin axis. The gimbal 24 is in turn pivoted about the bearings 42 thus permitting the gyro can universal freedom of movement within the outer gimbal 25 although as pointed out above, freedom of movement is limited in the preferred application to only a few degrees.

The gimbal system shown in Fig. 4 is conventional and well known and it is therefore not the intention here to describe novel subject matter, but rather to more adequately supplement Fig. 1 so as to permit more ready visualization of our invention.

From the foregoing description, it will be evident that fluid will completely fill the space shown in Fig. 4 between the gyro can 21 and the gimbal 24 as well as between the gimbals 24 and 25, and if the principles of our invention are followed, the gyro can and the gimbal to which it is pivotally connected will be buoyed in neutral suspension so that any external shock received will not stress the bearings 23 and 42.

While a particular embodiment of our invention has been illustrated and described, modifications thereof will readily occur to those skilled in the art. It should be understood therefore that the invention is not limited to the particular arrangement disclosed but that the appended claims are intended to cover all modifications which do not depart from the true spirit and scope of our invention.

What we claim is:

1. A gyroscopic device comprising an assembly including a member having a gyro therein, a gimbal, a frame, said gimbal interconnecting said frame with said member to permit universal movement of said member, a container for said assembly, and a fluid in said container for buoying said assembly in neutral suspension in the fluid.

2. A gyroscopic device comprising an assembly including, a sealed member having a gyroscope enclosed therein, a gimbal, a frame, and bearing means for interconnecting said member for universal movement within said gimbal and said frame, a container enclosing said assembly, and a fluid disposed in said container and having a specific gravity such that the buoyant force exerted thereby on said sealed member is substantially equal to the weight of said sealed member.

3. A gyroscopic device comprising a member having a gyro therein, a gimbal, a frame, said gimbal interconnecting said frame with said member to permit universal movement of said member, a container for enclosing said member, said gimbal and said frame, and a fluid in said container for buoying said member in neutral suspension in said fluid.

4. A gyroscopic device comprising a sealed member having a gyro therein, a gimbal, a frame, said gimbal interconnecting said frame with said sealed member to permit universal movement of said sealed member, a container for enclosing said sealed member, said gimbal and said frame, and a fluid in said container for buoying said sealed member in neutral suspension in said fluid.

5. A gyroscopic device comprising a sealed member having a gyro therein, a gimbal connecting said member for pivotal rotation about a first axis, a frame connecting said gimbal for pivotal rotation about an axis normal to said first axis, a container, and a fluid in said container into which said sealed member, said gimbal and said frame is immersed, the size of said sealed member being so related with respect to the specific gravity of said fluid that it is neutrally suspended in said fluid.

6. A device in accordance with claim 5 wherein the effective specific gravity of the gimbal and the frame is substantially equal to the specific gravity of said fluid.

7. A device in accordance with claim 6 wherein said member is hermetically sealed.

8. A gyroscopic device comprising an assembly including a member having a gyro therein, a gimbal, a frame, said gimbal interconnecting said frame with said member to permit universal movement of said member, a container for said assembly, an expansible chamber communicating with said container, and a fluid disposed in said container and in said chamber.

9. A device in accordance with claim 8 wherein said chamber comprises a bellows.

10. A gyroscopic device comprising a sealed cylindrical container, sealed bellows communicating with said container, an annular frame fitted within said container, a sealed member containing a gyro, a gimbal having bearings mounting said member for limited pivotal rotation about an axis normal to the spin axis of said gyro, bearing means mounting said gimbal upon said frame for limited pivotal rotation about an axis normal to the gimbal pivot axis and the gyro spin axis, and a high density fluid disposed in said housing so as to be in continuous relationship with respect to said bearings.

11. A gyroscopic device comprising a sealable container having bellows communicating therewith, a hermetically enclosed gyro member, gimbal means for coupling the container with said gyro member to permit universal movement thereof, torque motors for exerting a magnetic force between said gyro member and said container, and a fluid disposed in the interstices between the hermetically enclosed gyro member and the container, the weight of said gyro member being such that it is substantially equal to the buoyant force exerted by said fluid.

12. A device in accordance with claim 11 further comprising glass seals in said container, and leads running through said container to permit energization of the gyro and torque motors.

FRITHIOF V. JOHNSON.
FRANCIS R. FOWLER.

REFERENCES CITED

The following references are of record in the file of this patent:

UNITED STATES PATENTS

| Number | Name | Date |
| --- | --- | --- |
| 794,654 | Anschutz-Kaempfe | July 11, 1905 |
| 1,480,637 | Schuler | Jan. 15, 1924 |
| 1,501,886 | Abbot | July 15, 1924 |
| 2,307,590 | Kenyon | Jan. 5, 1943 |